United States Patent [19]
Li

[11] Patent Number: 6,107,954
[45] Date of Patent: Aug. 22, 2000

[54] OPTICAL RF SUPPORT NETWORK

[76] Inventor: Ming-Chiang Li, 11415 Bayard Dr., Mitchellville, Md. 20721

[21] Appl. No.: 08/212,385

[22] Filed: Mar. 14, 1994

Related U.S. Application Data

[63] Continuation-in-part of application No. 08/018,388, Feb. 17, 1993, abandoned, and a continuation-in-part of application No. 07/877,419, May 1, 1992, Pat. No. 5,294,930, and a continuation-in-part of application No. 07/787,085, Nov. 4, 1991, Pat. No. 5,296,860.

[51] Int. Cl.[7] .............................. G01S 7/48; G01S 13/86
[52] U.S. Cl. .............................. 342/54; 342/13; 342/58; 342/125; 342/126
[58] Field of Search .................... 342/59, 13, 58, 342/54, 62, 56, 60, 73, 82, 14

[56] References Cited

U.S. PATENT DOCUMENTS

| | | | |
|---|---|---|---|
| 5,144,468 | 9/1992 | Weverka et al. | 359/173 |
| 5,294,930 | 3/1994 | Li | 342/13 |
| 5,296,860 | 3/1994 | Li | 342/58 |
| 5,313,266 | 5/1994 | Keolian et al. | 356/345 |
| 5,319,438 | 6/1994 | Kiasaleh | 356/345 |
| 5,331,453 | 7/1994 | Lipsky | 359/191 |
| 5,381,426 | 1/1995 | Fontana et al. | 372/18 |
| 5,424,863 | 6/1995 | Gertel | 359/173 |
| 5,430,569 | 7/1995 | Blauvelt et al. | 359/162 |
| 5,442,720 | 8/1995 | Shaw | 385/16 |

*Primary Examiner*—John B. Sotomayor

[57] ABSTRACT

This invention relates to advanced RF support systems which utilize optical fibers or direct lasers to achieve RF transmission and reception of navigation signals from widely separated supporting sites. The functional goals of these systems are to support navigation, guidance, control, and survey systems. A RF supporting network according to the present invention comprises a master supporting site; a number of secondary supporting sites; and a network of optical RF link systems which links secondary supporting sites with the master supporting site. The stable clock, GPS signal generators, and receivers are located only at the master site, which is also the processing, command, and control center. A network architecture of the present invention will provide a low cost mean to users in need of precision navigation and time information. Furthermore, the present invention furnishes an advance means in determining the instantaneous velocity of GPS satellites with high accuracy.

The present invention drastically increases our navigation and survey capabilities as well as other applications.

20 Claims, 6 Drawing Sheets

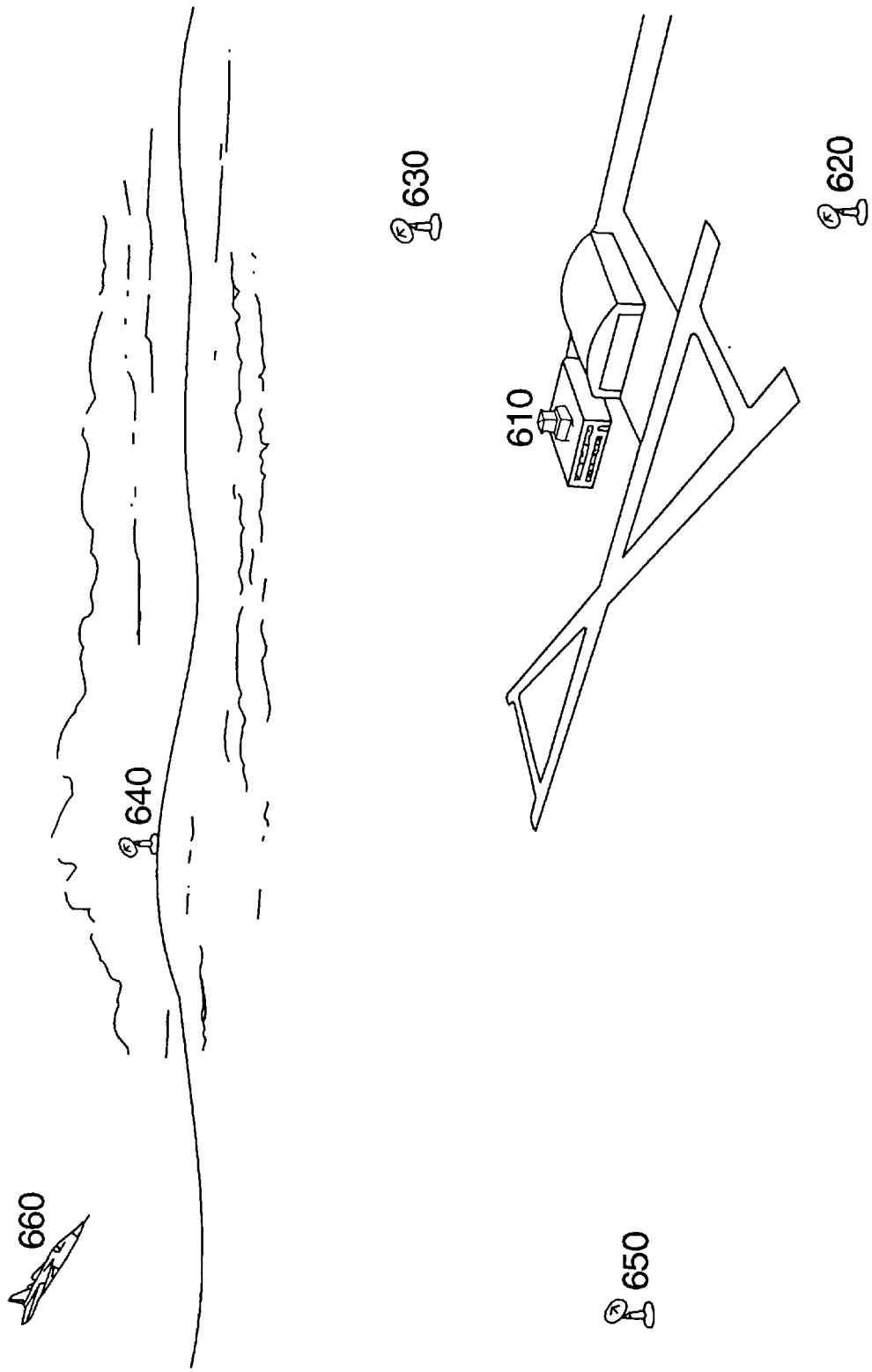

OPTICAL RF SUPPORT NETWORK

This is a Continuation-In-Part of the pending applications:
Application Ser. No.: 08/018,388
Group Art Unit: 2202
Filing Date: Feb. 17, 1993, abandoned
Applicant: Ming-Chiang Li
Appn. Title: Optical Fiber Based Radars
Application Ser. No.: 07/877,419
Group Art Unit: 2202
Filing Date: May 1, 1992, now 5,294,930
Applicant: Ming-Chiang Li
Appn. Title: Optical RF Stereo
Application Ser. No.: 07/787,085
Group Art Unit: 2202
Filing Date: Nov. 4, 1991, now U.S. Pat. No. 5,296,860
Applicant: Ming-Chiang Li
Appn. Title: Optical Fiber Based Bistatic Radar

TECHNICAL FIELD OF INVENTION

This invention relates to advanced RF support systems which utilize optical fibers or direct lasers to achieve RF transmission and reception of navigation signals from widely separated supporting sites. The functional goals of these systems are to support navigation, guidance, control, and survey systems. The present invention drastically increases our navigation and survey capabilities as well as other applications.

BACKGROUND

The global positioning system (GPS) is being developed and deployed by the U.S. Department of Defense to support military navigation and timing needs. Federal Aviation Administration now has declared that the GPS system is acceptable for civil aircraft navigation. The GPS provides a most competent and all-weather system in navigation and surveying. It consists of at least 18 satellites and 3 active spare satellites. There may be 24 GPS satellites in the final constellation in order to eliminate the degradation.

These satellites transmit at frequencies L1=1575.42 MHz and L2=1227.6 MHz with two types of modulated codes, which are precision (P) code and coarse/acquisition (C/A) code with the chipping rates of 10.23 MHz and 1.023 MHz respectively. The encrypted P-code provides the precise positioning service to the United states and allied militaries. The standard positioning service is available world wide with degraded signals in comparison with the precise positioning service. The degradation, which is called as selective availability, is through the introduction of clock errors to the on-board atomic clocks and to the navigation message transmitted by the satellites. Civil GPS receivers are C/A code receivers providing the positioning accuracy at 100 m level.

A requirement in the positioning accuracy better than 100 m leads to the needs of supporting sites to supplement the information provided by the standard positioning service. The differential GPS uses a known supporting site as a reference. Pseudo ranges to all tracked satellites from the known site are observed through the aid of a GPS receiver. The observed pseudo ranges are compared with the degraded pseudo range information from the GPS navigation message. Differences between the observed and degraded pseudo ranges reveal the errors associated with the selective availability and ionospheric effects. The motivation for using differential operation is that these errors are common to GPS receivers operating at the spatial and temporal vicinities of the known site. The revealed errors, which are referred to as differential corrections, then are transmitted over a digital data link to the users at the vicinity to remove their GPS receiver degradation owing to the selective availability and ionospheric effects.

Supporting sites may transmit GPS like signals. These signals are referred to as the pseudolites. Their use leads to carrier-phase tracking in sharping the GPS accuracy for precision aircraft landing at lower visibility Category 2 and Category 3 conditions. The accuracy will further enhanced the reliability in using the GPS system. The dependability and accuracy will be properly assured, if more known and widely separated sites are deployed.

GPS signal generators and receivers are active radio frequency (RF) systems. Each of these supporting sites is equipped with the active systems as well as stable clocks. The operating foundations of the GPS system are the spread spectrum and precision time reference. A stable clock is an essential apparatus for a GPS signal generator and receiver to execute their functions. The stable clocks have to be strictly maintained and rigidly synchronized. The integrity of these active systems has to be stringently preserved. The synchronization and integrity are most important to achieve the desired accuracy in a GPS application. Any failure of an active RF signal generator or receiver at a supporting site has to be promptly identified and isolated in order to prevent any catastrophe arising from the failure. It is difficult as well as expensive to maintain the supporting sites at such high integrity and expectation. The difficulty mounts, if a secondary supporting site is not directly visible to the master supporting site. No low cost means exist to promptly verify the integrity of the transmitted GPS signals under such circumstances.

In light of the above, there is a need in the art for a supporting network which is simple and inexpensive and does not require active RF signal generators and receivers located at individual supporting sites. There are further needs to provide a low cost service to wide segments of users with precision navigation and time information despite the selective availability. Furthermore, there are needs to advance the art of providing precision navigation and time.

SUMMARY OF THE INVENTION

Embodiments of the present invention advantageously satisfy the above-identified need in the art. Embodiments of the present invention provide a supporting network which is simple, inexpensive, and versatile; which utilizes only a single stable clock and the synchronization will no longer be a problem; and which does not require GPS signal generators and receivers located at individual support sites. In particular, an embodiment of the invented RF supporting network comprises a master supporting site; a number of secondary supporting sites; and a network of optical RF link systems which links secondary supporting sites with the master supporting site.

In a preferred embodiment of the present invention, secondary sites are equipped with antennas which transmit and receive RF signals. As a result, these secondary site are passive and do not require operation personnel. The stable clock, GPS signal generators, and receivers are located at the master site, where the processing is done. GPS signals received by antennas at the secondary supporting sites are directly sent through the network of optical RF link systems directly to GPS receivers at the master supporting site for processing. GPS signals generated by GPS signal generators at the master supporting site are sent directly through the network of optical RF link systems to the antennas at the secondary supporting sites for transmission. Furthermore, the maser supporting site is the command and control center. Command and control signals generated from the master supporting site are sent through optical RF link systems to the secondary supporting sites. As those of ordinary skill in the art will readily appreciate, the architecture of the present invention will ease the burden in maintaining the integrity and assuring the reliability of the supporting network.

BRIEF DESCRIPTION OF THE DRAWING

A complete understanding of the present invention may be gained by considering the following detailed description in conjunction with the accompanying drawings, in which:

FIG. 6 shows pictorially an architecture for use in fabricating embodiments of an independent optical RF supporting network according to the present invention. Embodiments further provides a kinematic precision landing system without a help from GPS satellites.

DETAILED DESCRIPTION

Figure 1:
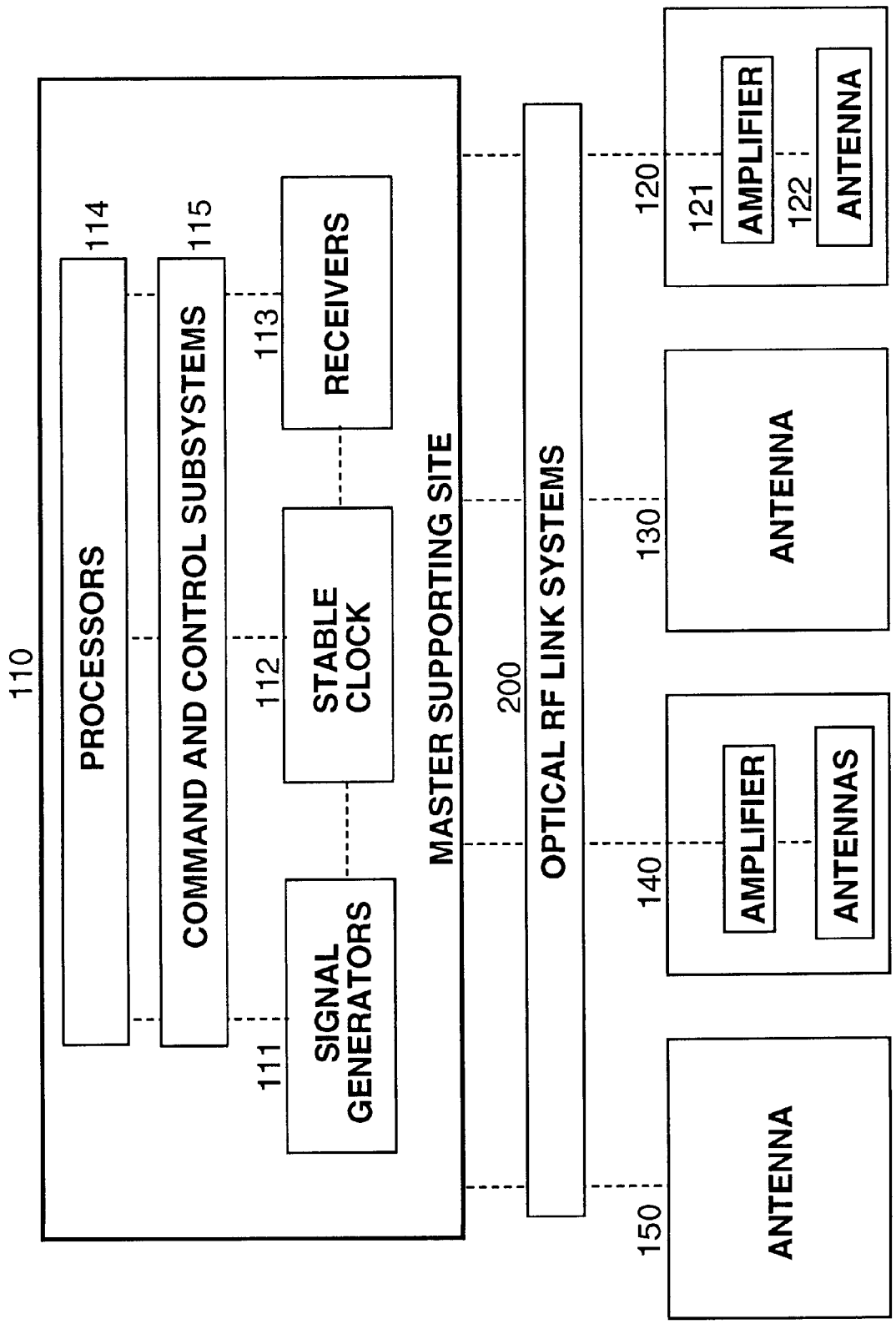
FIG. 1 shows a block diagram of an optical RF supporting network fabricated in accordance with the present invention.

FIG. 1 shows a block diagram of an optical RF supporting network 100 fabricated in accordance with the present invention. The detailed architecture of an optical RF supporting network varies with the needs. The main features of an optical RF supporting network is that only the master supporting site has the stable clock, signal generators, and receivers. There is no need for them to be at secondary supporting sites.

As shown in FIG. 1, signal generators 111, stable clock 112, receivers 113, processors 114, command and control subsystems (CCS) 115, are housed in a master supporting site 110 for an effective utilization of resources and purpose of reducing operation costs. In accordance with the present invention, CCS 115 commands and controls the master supporting site 110 as well as secondary supporting sites 120, 130, 140, 150, . . . The navigation RF signals received by the antennas at supporting site are sent through optical RF link systems (ORLS) 200 to receivers 113 at the master supporting site 110 for processing. Receivers 113 use stable clock 112 as reference to process the received navigation RF signals. Under the supervision of CCS 115, receivers 113 forward the processed navigation signals to processors 114, which then convert the navigation signals to navigation messages. Based on the navigation messages, processors 114 originate a new set of navigation messages, and CCS 115 initiates a set of orders to signal generators 111. Under the supervision of CCS 115, according to thee present invention, signal generators 111 using stable clock 112 as a reference to generate a set of navigation RF signals according to the navigation messages and orders. The set of generated navigation RF signals is then sent through ORLS 200 to the secondary supporting sites of interest according to the orders from CCS 115. After the amplification, the navigation RF signals are transmitted to the free space through antennas at the secondary supporting sites of interest. These transmitted navigation RF signals are often called as pseudolites.

CCS 115 is apparatus which is well known to those of ordinary skill in the art and the manner in which command and control signals are generated thereby is also well known to those of ordinary skill in the art. Further, as well known to those of ordinary skill in the art, the command and control signals typically take the form of digital signals. Still further, the manner in which the command and control signals control signal generators 111, receivers 113, processors 114, and secondary supporting sites is also well known to those of ordinary skill in the art.

Stable clock 112 is an atomic clock. There are many types of atomic clocks. The common choice is a cesium clock. As those of ordinary skill in the art should readily appreciate, transmitting and receiving antennas may be located with master supporting site 110. Secondary supporting sites 120, 130, 140, 150, . . . are strategically located to cover the area, which are connected to optical RF support network 100. The number of secondary supporting sites is determined according to needs. Some of these sites are receiving, and some are transmitting. Others may be both transmitting and receiving functions. Some of the transmitting sites might have auxiliary antennas to monitor the integrity of transmitted navigation RF signals from these sites by feeding back the transmitted signals to the auxiliary antennas. The received navigation RF signals from the auxiliary antennas are sent through ORLS 200 to master supporting site 110 for analysis of the integrity.

Receivers 113 are spread spectrum receivers, which are well known to those of ordinary skill in the art. A state-of-the-art GPS receiver can measure carrier phases of navigation RF signals to about $\frac{1}{100}$ of a cycle, which is about several millimeters in linear length. Signal generators 111 generator pseudo random noise codes, and are also well known to those of ordinary skill in the art. The P code for the GPS system is the principle navigation code, and C/A code is a medium accuracy navigation code. The epochs of the C/A code are synchronized with the epochs of P code. It is further known to those of ordinary skill in the art that C/A code allows the reading of the navigation message, which contains information on the ephemerides of the satellites, GPS system status, time, and clock behavior. Pseudo random codes transmitted by each secondary supporting sites are mutually exclusive, which allows an user to distinguish the signals from each of the secondary supporting sites simultaneously. As those of ordinary skill in the art should appreciate, pseudo random noise codes generated by signal generators 111 are comparable with GPS codes for receiving by the GPS receivers.

Antenna positions at secondary supporting sites 120, 130, 140, 150, . . . are precisely known. The time delays from these antennas through ORLS 200 to their respective receivers 113 at master supporting site 110 are precisely determined. The same is true for the time delay from signal generators 111 at master site 110 through ORLS 200 to their respective antennas at secondary supporting sites. It is well known to those of ordinary skill in the art that a single receiving leads to the differential GPS, and a pair of receiving and transmitting supporting sites forms a kinematic Doppler marker.

It is well known to those of ordinary skill in the art that a state-of-the-art GPS receiver can measure the carrier phase to a small fraction of a wave length. The kinematic techniques of differential ranging are based on the phase tracking. The precision is achieved by measuring the phase difference between two antennas at different spatial locations. These are extremely precise measurements providing centimeter accuracy, which are suitable for Category 3 instrument landings. However, there is an integer ambiguity associated with phase difference. It is also well known to those of ordinary skill in the art that an aircraft flying over a kinematic Doppler marker will be able to resolve the carrier phase ambiguities by using Doppler shift. Flying over a kinematic Doppler maker with two transmitting supporting sites will provide enough information to locate the aircraft in three-dimensions within less than a centimeter. As those of ordinary skill in the art will readily appreciate, embodiments of the present invention will make a kinematic maker simple to operate and guarantee its integrity.

As those of ordinary skill in the art will further appreciate, an optical RF supporting network with four or more secondary supporting sites in receiving will determine precisely the functional status of GPS satellites within view. The precision navigation information can either transmit to users through the transmission of secondary supporting sites or through external digital links. All the degradation will be removed. It is independent of whether the military degrades the GPS signals or not. An user at the serving area of the optical RF supporting network with a C/A code receiver will be able to achieve the same level of precision as a P code receiver.

As those of ordinary skill in the art will appreciate, embodiments 100 of the present invention provide coherent connections among secondary supporting sites. Secondary supporting sites coherently act together and form an RF interferometer without being limited by land profiles. As those of ordinary skill in the art will further appreciate, the coherent connections provide a new mean in determining the geocentric position of a GPS satellite through carrier phases. The new mean will advance the art in using the GPS system.

As those of ordinary skill in the art will further appreciate, embodiments 100 of the present invention are generic. The optical RF supporting network can be an independent network without any references to the GPS system, or it may operate in junction with other RF navigation systems.

Figure 2:
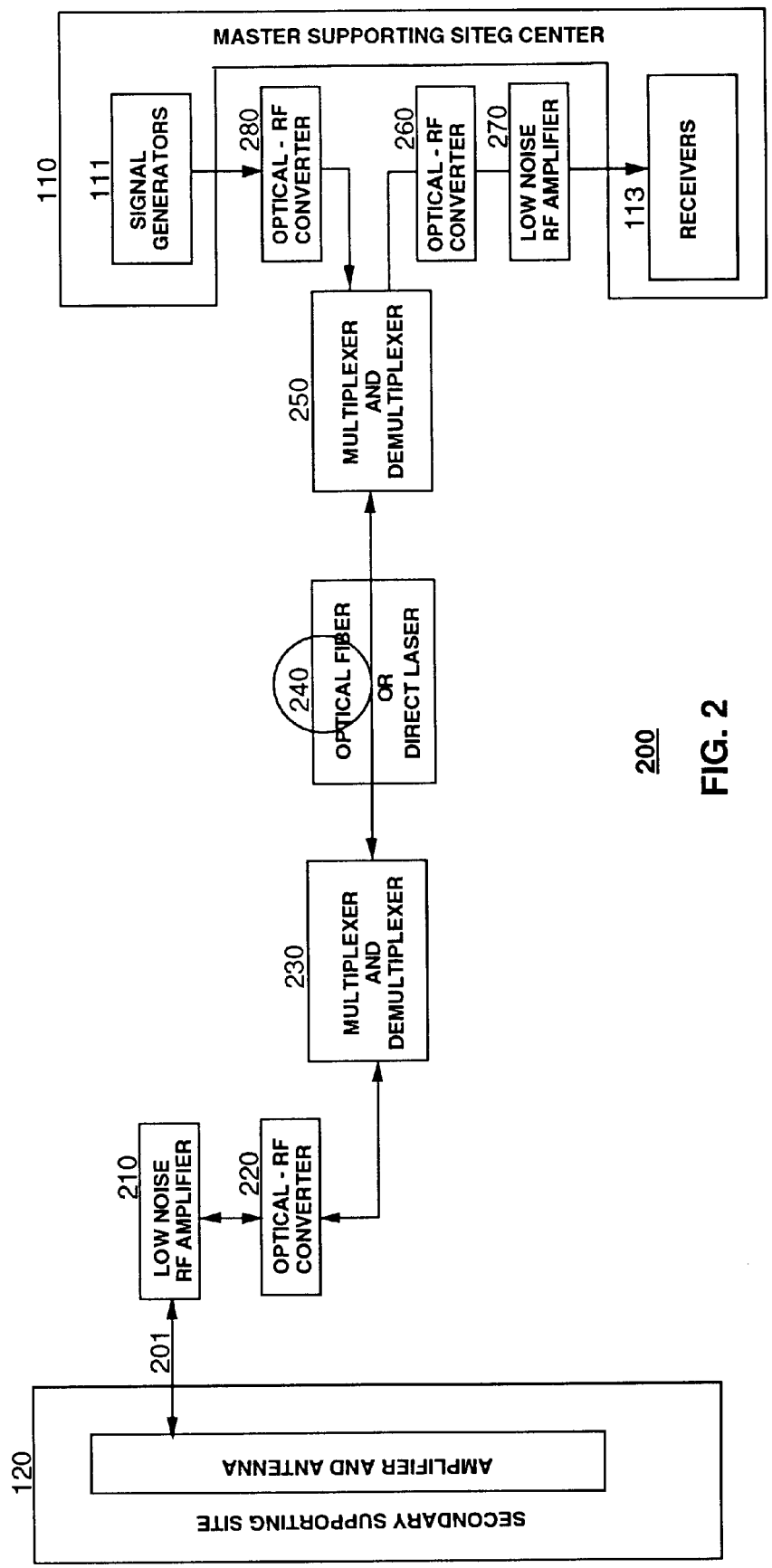
FIG. 2 shows a block diagram of an optical RF link system for use in fabricating embodiments of the present invention.

FIG. 2 shows a block diagram of an optical RF link system for use in fabricating embodiments of the present invention. The optical RF link system is basically an optical RF link system as specified in the parent inventions. As shown in FIG. 2, either the optical fiber or the direct laser is selected as the medium for sending RF signals. The selection depends on the problems on hand. The optical RF link system sends RF, command, and control signals to and back from master supporting site 110 to secondary supporting sites 120, 130, 140, 150, . . . both optical-up and down-converters are used. All converters are referred to as optical-RF converters.

As shown in FIG. 2 of receiving mode operation, secondary supporting site 120 outputs received navigation RF signals 201. Then, navigation RF signals 201 are applied as input to low noise RF amplifier 210 to assure enough signal strength in order to overcome optical conversion losses. The output from RF amplifier 210 is applied as input to optical-RF converter 220. Optical-RF converter 220 converts the output from RF amplifier 210 into optical signals. The optical signals from optical-RF converter 220 are applied as input to multiplexer and demultiplexer 230. Multiplexer and demultiplexer 230 applies the optical signals as input to optical fiber or direct laser 240 for transmission to multiplexer and demultiplexer 250 at master supporting site 110. Multiplexer and demultiplexer 250 applies the optical signals as input to optical-RF converter 260. Optical-RF converter 260 converts the optical signals back to RF signals and applies the RF signals as input to low noise RF amplifier 270. RF amplifier 270 amplifies the RF signals and applies them as input to receiver 113 for processing.

As shown in FIG. 2 of transmitting mode of operation, signal generator 111 uses the generated navigation RF signals as input to optical-RF converter 280. Optical-RF converter 280 converts the navigation RF signals into optical signals. The optical signals from optical-RF converter are applied as input to multiplexer and demultiplexer 250. Multiplexer and demultiplexer 250 applies the optical signals as input to optical fiber or direct laser for transmission to multiplexer and demultiplexer 230 at secondary supporting site 120. Multiplexer and demultiplexer 230 applies the optical signals as input to optical-RF converter 220. Optical-RF converter 220 converts the optical signals to the navigation RF signals and applies the navigation RF signals to low noise RF amplifier 210. Low noise RF amplifier 210 amplifies the navigation RF signals and send to an amplifier at secondary supporting site 120. The amplifier send the amplified navigation RF signals to the antenna for transmission to free space.

Low noise RF amplifier 210, optical-RF converter 220, multiplexer and demultiplexer 230, optical fiber or direct laser 240, multiplexer and demultiplexer 250, optical-RF converter 260, low noise RF amplifier 270, and optical-RF converter 280 are apparatus which are well known to those of ordinary skill in the art. For example: (a) optical-RF converters typically comprise modulated lasers and photodetectors and (b) optical multiplexer and demultiplexer may comprise a spliced optical fiber, a hybrid of a grating and a dielectric thin-film filter, a planar wave guide, and so forth. The laser modulation may be direct to the laser source or through external modulation. All above apparatus are well known to those of ordinary skill in the art.

As those of ordinary skill in the art will readily appreciate, embodiments other than the specific configuration shown in FIG. 2 may be fabricated to provide ORLS 200. For example, the various converters may be combined with the multiplexer and demultiplexers by using multi-wavelength light sources and photodiodes; command and control signals may have own their independent link systems which may or may not be optical fiber or direct laser based. ORLS 200 may consist a number of fibers or direct lasers for sending back and forth navigation RF signals. Further, as optical fiber in-line-amplifiers become available, one may use these amplifiers for ORLS 200.

Figure 3:
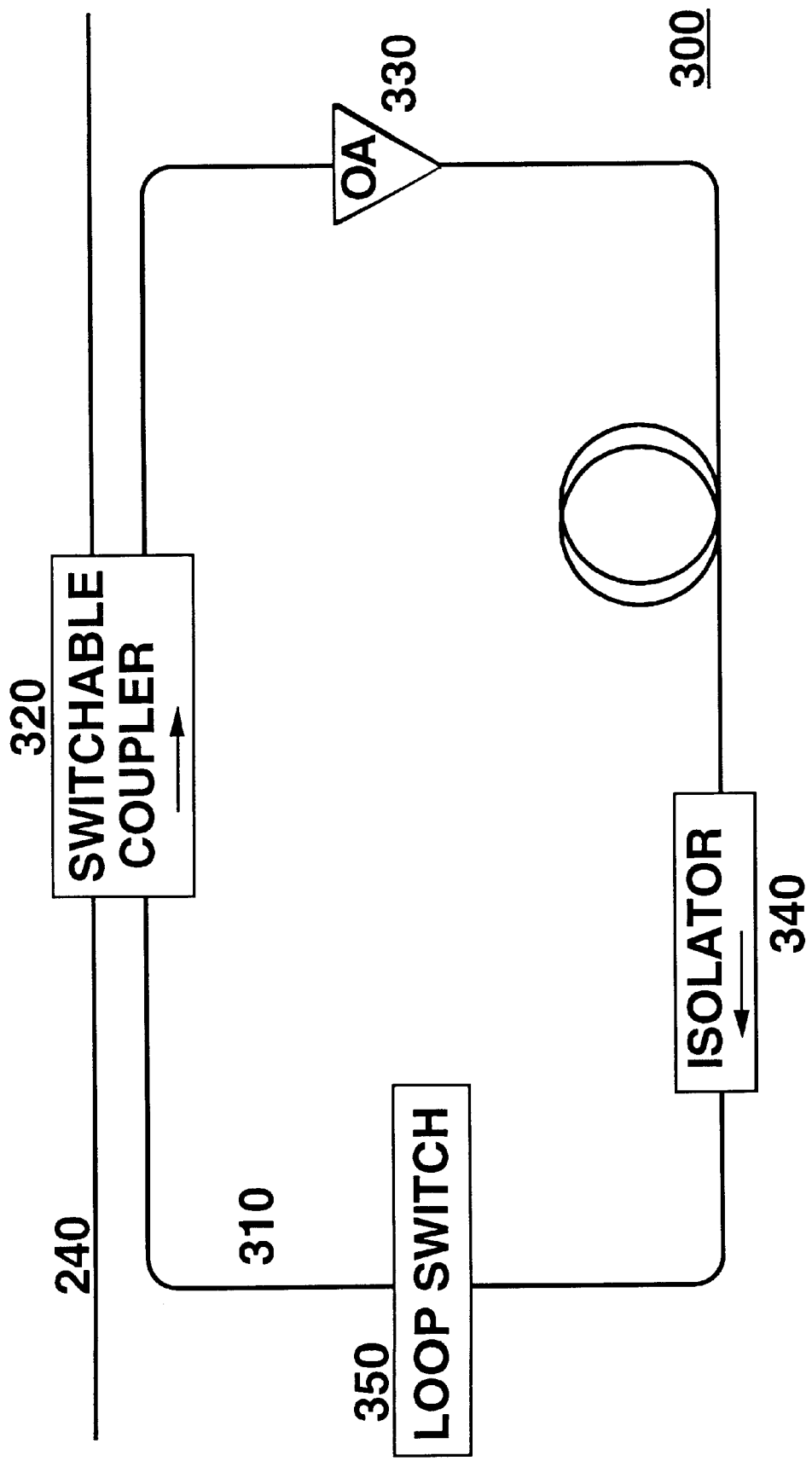
FIG. 3 shows a diagram of an optical fiber RF delay loop for use in fabricating embodiments of the present invention which provides proper delay for the carrier phase processing of the navigation RF signals.

FIG. 3 shows a diagram of a optical fiber RF delay loop 300 for use in fabricating embodiments of the present invention which provides proper delay for the carrier phase processing of the navigation RF signals. As shown in FIG. 3, partial optical RF signals in optical fiber 240 are switched into optical fiber loop 310 through switchable coupler 320. The tapped optical RF signals are amplified through the in-line optical amplifier 330 ("OA 330"). Isolator 340 assures the optical RF signals in the loop 310 only circulating in one direction. As the optical signals circulate the loop, the signal strength reduces. The reduction is compensated by OA 330 to keep the optical RF signals circulating in the loop again and again until switchable coupler 320 is open. A portion of optical RF signals are switched back to optical fiber 240 and the remainders are still in the loop circulating. The loop switch 350 will be closed to stop the circulation of optical RF signals in the loop, before the expected arrival of new optical RF signals from optical fiber 240. The switchable coupler 320 can be simply a combination of a switch and coupler. Arrows in FIG. 3 indicate the flow direction of optical signals. As technology advances, new devices may be added to optical fiber RF delay loop 300 to assure the quality and to increase the storage time of optical RF signals in the loop.

It is well known to those of ordinary skill in art that two types of GPS observables are pseudo range and carrier phase. The pseudo range is a measure of the distance between the satellite and the receiver at the epochs of transmission and reception of the navigation RF signals. The phase observable is the difference between the phase of the carrier of the navigation RF signals from the satellite and the phase of the local oscillator within the receiver at the epoch of measurement. The epoch for a passage of navigation RF signals is transient in nature. After the passing of the epoch, the carrier phase of navigation RF signals cannot be measured again. Optical fiber RF delay loop 300 is a memory for storing the transient passage of navigation RF signals. Optical fiber RF delay loop 300 leads to a new mean in faithfully reproducing the same passage again and again. The reproduction provides us new epochs to scrutinized the carrier phase repeatedly. The carrier phase of a navigation passage from a GPS satellite can be repeatedly measured. A measurement will yield a set of phases for the carrier of the navigation passage. The time delay of optical fiber RF delay loop 300 is a fixed constant. Through a fast Fourier transformation of phases, we then determine the Doppler shift of the carrier caused by the satellite motion. The precision of the determined Doppler shift depends on the ability of optical fiber RF delay loop 300 in maintaining the integrity of the navigation RF signals. If we can maintain the signals for more than 1, 10, and 100 seconds, then the velocity accuracy for a GPS will be less than 20, 2, and 0.2 centimeters per second respectively. Those of ordinary skill in the art will appreciate that optical fiber RF delay loop 300 has advanced the art on the high accurate determination of velocity with the GPS system.

It is well known to those of ordinary skill in the art that the differential range is the determination of the relative position vector for an unknown position with respect to a known position. The Doppler shifts of a GPS satellite with respect to the known and unknown positions are different. The difference comes from the magnitude and orientation of the relative position vector. By observing the Doppler shift differences from three GPS satellites, the relative position vector can be determined. As those of ordinary skill in the art will appreciate, the carrier phase ambiguity associated with kinematic phase tracking will no longer appear in measurements with optical fiber RF delay loops.

In further embodiments of the present invention, optical fiber RF delay loops are used to remove the time arrival differences of the navigation RF signals from a GPS satellite through a number of secondary supporting sites to the master supporting site. As those of ordinary skill in the art will appreciate, secondary supporting sites have functioned together in forming an RF interferometer without being limited by land profiles. The navigation RF signals from the said satellite are enhanced, and from other satellites are suppressed. Furthermore, multiple path effects are also suppressed. As those of ordinary skill in the art will appreciate, the coherent connection of multiple secondary supporting sites will prevent a spread spectrum RF signals to conceal by random noises, and will make a spread spectrum deception vulnerable.

Figure 4:
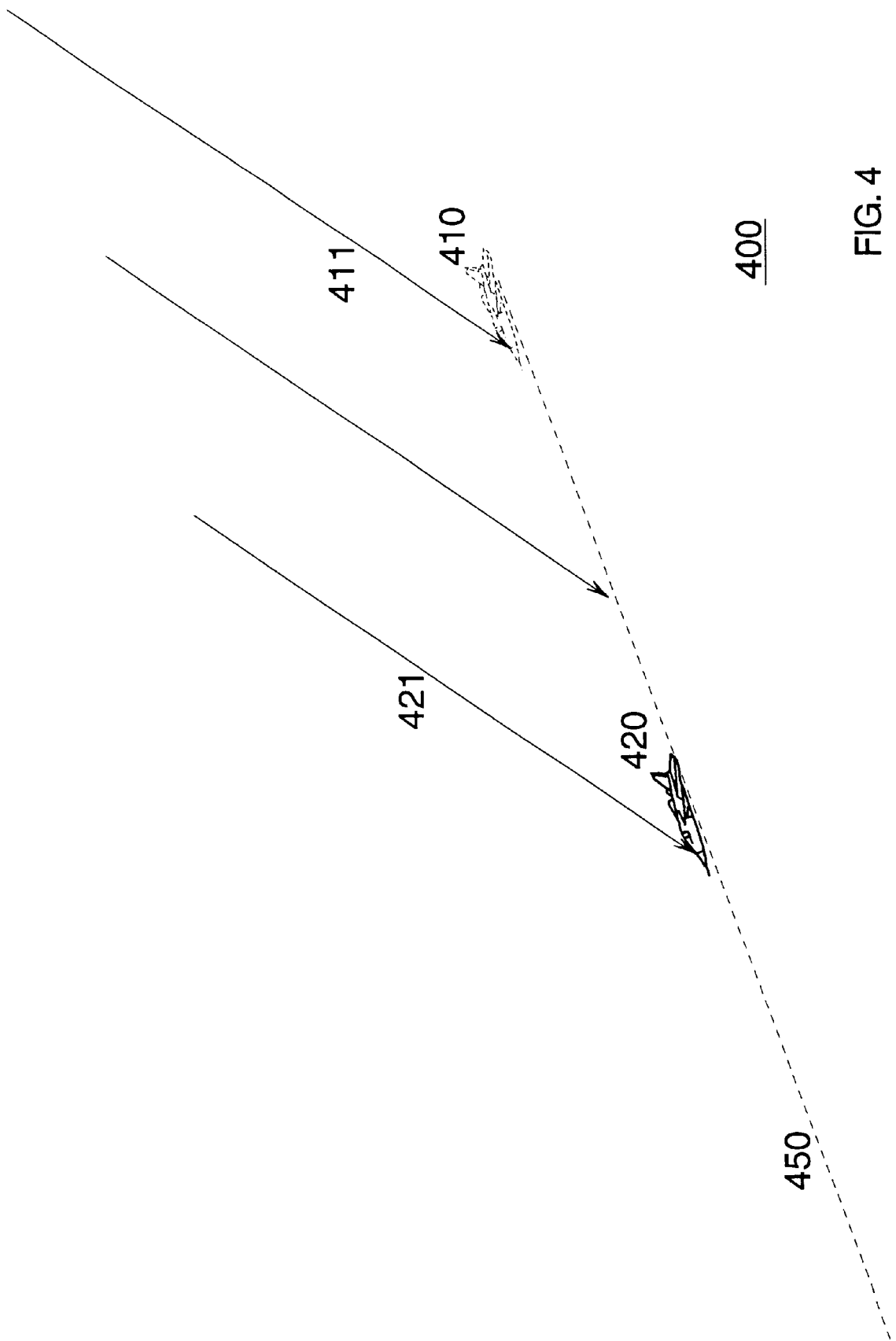
FIG. 4 shows an embodiment of the present invention for the on-board differential ranging of a moving platform.

FIG. 4 shows an embodiment 400 of the present invention for the on-board differential ranging of a moving platform. The teaching presented above leads to the precision velocity determination of GPS satellites. Further Doppler shift measurements on board an aircraft with a optical fiber RF delay loop leads to the precision determination of aircraft velocity with respect to the GPS satellites as well as to the ground. FIG. 4 depicts that an aircraft, flying along a path 450, with an initial position 410 moves to position 420. Rays 411 to 412 indicate navigation RF signals from a GPS satellite. The initial aircraft velocity is measured at the position 410. By sequentially measuring the aircraft velocity, the aircraft position along the path with respect to the initial position at any instant is precisely determined. It is well known to those of ordinary skill in the art that the relative position vector is the time integration of the velocity vector. As those of ordinary skill in the art will appreciate, with the help of optical fiber RF delay loop 300 the ground markers are not needed in the kinematic differential ranging.

Figure 5:
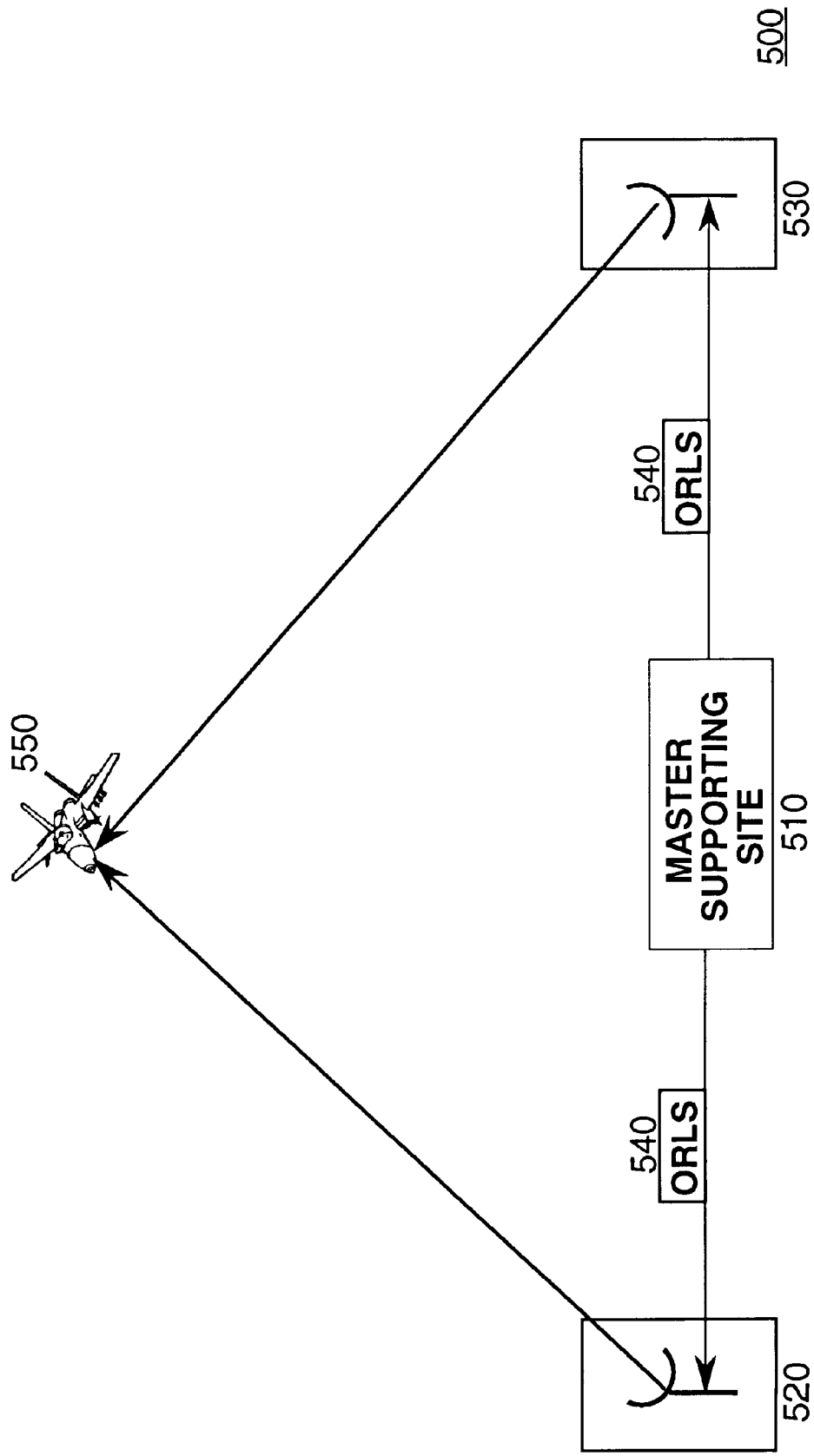
FIG. 5 shows pictorially an architecture for use in fabricating embodiments of an optical RF supporting network according to the present invention. Embodiments are capable of providing a differential range capability without the need of differential corrections.

FIG. 5 shows pictorially an architecture for use in fabricating embodiments 500 according to the present invention for an optical RF supporting network. According to the present invention, the single stable clock at master supporting site 510 is a focal point of the reference for the network operation. Signal generators at master supporting site 510, in reference to the stable clock, generate the navigation RF signals. The generated navigation RF signals are sent through ORLS 540 to secondary supporting sites 520 and 530. After the amplification by amplifiers, the antennas at sites 520 and 530 transmit navigation RF signals to the free space. The transmitted navigation RF signals from sites 520 and 530 are coherent, since these signals were generated in reference to the same stable clock. It is well known to those of ordinary skill in the art that differential corrections are not needed for the coherent signals. As those of ordinary skill in the art will further appreciate, the navigation RF signals transmitted from sites 520 and 530 will provide aircraft 550 a kinematic differential capability without the need of differential corrections.

FIG. 6 shows pictorially an architecture for use in fabricating embodiments of an independent optical RF supporting network according to the present invention. Master supporting site is connected with secondary supporting sites 620, 630, 640, and 650 through optical RF link systems. A stable clock at master supporting site 610 is a focal point of the reference for the network operation. Signal generators at master supporting site 610, in reference to the stable clock, generate the navigation RF signals. The generated navigation RF signals are sent through optical RF link systems to secondary supporting sites 620, 630, 640, and 650. After the amplification by amplifiers, the antennas at sites 620, 630, 640, and 650 transmit navigation RF signals to the free space. The transmitted navigation RF signals from sites 620, 630, 640, and 650 are coherent, since these signals were generated in referring to the same stable clock. As those of ordinary skill in the art will appreciate, the navigation RF signals transmitted from sites 620, 630, 640, and 650 will provide aircraft 660 a differential capability in determining the position vector of aircraft with high precision. Optical RF supporting network 600 is a kinematic precision landing system.

In accordance with the present invention optical RF supporting network 600, with four or more secondary supporting sites in transmission, further provides a service similar to that of GPS satellites in the local area of the network. The precision navigation information is transmitted to users through the transmission of navigation RF signals from the secondary supporting sites. The users are able to use a pseudo range like method to compute their clock errors and position vectors with respect to optical RF supporting network 600. The computation is independent of the existence of the GPS system. All the errors associated with the operation of optical RF supporting network 600 can be properly identified. The same is not true for the GPS system. An user at the serving area of optical RF supporting network 600 with a C/A code like receiver will able to achieve a better precision than a P code receiver of the GPS system in determining his position vector.

ADVANTAGES AND OBJECTIVES

Embodiments of the present invention are advantageous because only one stable clock is needed for the entire optical RF supporting network. With a single stable clock, the integrity of the network is easily assured, and the precision will be faithfully maintained. Conventional supporting networks require a stable clock at each supporting sites. These clocks have to be constantly monitor and clock errors promptly identified.

Embodiments of the present invention are advantageous because all processing are done at the master supporting site. It leads to an optimum use of resources, and a lowering of the operation cost. The secondary supporting sites are simple. A large number of these sites can be deployed without escalating the cost. A deployment of a supporting network according to the present invention will increase the versatility and reliability of the operation.

Embodiments of the present invention are advantageous because the navigation RF signals are coherently transmitted and received at secondary supporting sites. The kinematic differential ranging is simple to implement in optical RF support network of the present invention. Differential corrections may not be necessary. According to the present invention, the optical RF support network may operate independently or may be used to support other navigation RF networks.

Embodiments of the present invention are advantageous because users with C/A code like receivers will be able to obtain the same kind of service as with P code receivers in accuracy. Embodiment provide means in overcoming the degradation of C/A code. The navigation messages transmitted by an optical RF supporting network of the present invention to the users at its service area will have the same quality as the navigation messages of P code. Furthermore, an independent optical RF supporting network according to the present invention will be able to provide a better, simple, rapid, and low cost service than the GPS system in the local area of the network operation. Embodiments of the present invention create a new commercial industry to satisfy the needs in precision time and position.

Embodiments of the present invention furnish an advance means in determining the instantaneous velocity of GPS satellites with high accuracy. The means of the present invention will advance the art of the GPS system, and will advance the technologies in using the GPS system. Embodiments of the present invention further furnish a mean for differential ranging without any support from the ground.

As those of ordinary skill in the art will appreciate, embodiments of the present invention can be easily integrated with optical fiber based radars, optical RF stereo systems, optical RF networks, and optical communication networks. As those of ordinary skill in the art will further appreciate, the integration will provide us a sophisticated and reliable network for national defense, navigation, kinematic survey, automatic guidance and control, monitoring deformation, high precision aircraft positioning, and other applications.

SUMMARY, RAMIFICATIONS, AND SCOPE

Those skilled in the art readily recognize that embodiments of the present invention may be made without departing from its teachings. For example, embodiments of the present invention may have many designs as well as different variations. Thus the scope of the invention should be determined by appended claims and their legal equivalent, and not limited to the examples presented here.

What is claimed is:

1. An optical RF support network comprising:
    a master supporting site;
    one or more secondary supporting sites; and optical RF link systems linking the secondary supporting sites to the master supporting site; wherein the secondary supporting sites comprise means for transmitting or receiving navigation RF signals; wherein the optical RF link systems comprise: (a) means for receiving navigation RF signals from one end; (b) means for up-converting the navigation RF signals to an optical signal; (c) means for transiting the optical signal from one end to a second end; (d) means for down-converting the optical signal at the second end to a navigation RF signal; and (e) means for transiting the navigation RF signals between the secondary supporting sites and the master supporting site.

2. The optical RF supporting network of claim 1 wherein master supporting site comprises means for generating command and control signals; wherein the optical RF link systems further comprise means for receiving the command and control signals from the master supporting site and for sending them to the secondary supporting sites; and wherein the secondary supporting sites further comprise means responsive to the command and control signals for controlling operation of means for transmitting or receiving the navigation RF signals.

3. The optical RF support network of claim 1 wherein said master supporting site comprises a stable clock; wherein the master supporting site further comprises means for receiving and generating the navigation RF signals with a reference to the stable clock.

4. The optical RF support network of claim 3 wherein said master supporting site comprises further means for reading navigation messages from received navigation RF signals; wherein the master supporting site further comprises means for processing the navigation messages and for generating new navigation messages; wherein the master supporting site further comprises means for sending the new navigation messages to the means for generating navigation RF signals with a reference to the stable clock.

5. The optical RF support network of claim 1 wherein one or more of said secondary supporting sites comprises both means for receiving and transmitting navigation RF signals; wherein said secondary supporting sites comprise further means for feeding back transmitted navigation RF signals from the means of transmitting to the means of receiving.

6. The optical RF support network of claim 1 wherein said master supporting site further comprises optical fiber RF delay loops; wherein the optical fiber RF delay loops comprise means for storing received navigation RF signals and for reproducing the stored navigation RF signals again and again; wherein the master supporting site further comprises means for processing the reproduced navigation RF signals.

7. The optical RF support network of claim 1 wherein said master supporting site further comprising means for correlating the received navigation RF signals from the secondary supporting sites; said master supporting site further comprises means for measuring carrier phase differences of the navigation RF signals from different secondary supporting sites.

8. The optical RF support network of claim 1 further comprising of:
   radar network;
   optical RF stereo systems;
      wherein said master supporting site further comprises means for integrating the radar networks and the optical RF stereo systems with the optical RF support network.

9. A method for operating optical RF support network comprising the steps of:
   (a) receiving navigation RF signals at secondary supporting sites;
   (b) linking each secondary supporting sites individually to a master site through optical RF link systems;
   (c) up-converting RF signals to optical signals;
   (d) sending optical signals from one ends of optical RF link systems to other ends;
   (e) down-converting the optical signals to RF signals;
   (f) sending navigation RF signals at secondary supporting sites to the master supporting site over optical RF link systems.

10. The method of claim 9 further comprising the steps of:
   (g) generating navigation messages at the master supporting site;
   (h) generating navigation RF signals at the master supporting sites from the navigation messages with a reference to a stable clock;
   (i) sending navigation RF signals at master supporting sites to the secondary supporting sites over optical RF link systems;
   (j) transmitting navigation RF signals at secondary supporting sites to free space.

11. The method of claim 9 further comprising the steps of:
   (g) generating command and control signals at the master supporting site;
   (h) sending the command and control signals from the master supporting site to the secondary supporting sites;
   (i) operating the secondary supporting sites in responding to the command and control signals.

12. The method of claim 9 further comprising the steps of:
   (g) receiving navigation RF signals from the secondary supporting sites at the master supporting site with a reference to a stable clock;
   (h) reading navigation messages from the navigation RF signals.

13. The method of claim 12 further comprising the steps of:
   (i) measuring arrival times of the navigation RF signals;
   (j) measuring carrier phases of the navigation RF signals.

14. The method of claim 9 further comprising the steps of:
   (g) storing the navigation RF signals in optical fiber RF delay loops at the master supporting site;
   (h) reproducing navigation RF signals from stored navigation RF signals in optical RF delay loops;
   (i) processing reproduced navigation RF signals.

15. The method of claim 9 further comprising the steps of:
   (g) correlating navigation RF signals from different secondary supporting sites at the master support center;
   (h) measuring carrier phase differences of the navigation RF signals.

16. The method of claim 9 further comprising the steps of:
   (g) integrating the optical RF support network with radar networks and optical RF stereo systems.

17. An apparatus for storing and reproducing spread spectrum RF signals comprising:
   an optical fiber RF delay loop; wherein the apparatus comprises means for converting a spread spectrum RF signal into optical RF signal; wherein the optical fiber RF delay loop comprises:
   (a) means for receiving an optical RF signal;
   (b) means for switching the optical RF signal into the optical fiber RF delay loop;
   (c) means for circulating the optical RF signal in the optical fiber RF delay loop;
   (d) means for switching a portion of the optical RF signal out of the optical fiber RF delay loop;
   (e) means for maintaining the optical RF signal in the optical fiber RF delay loop;
   (f) means for sending the portion of the optical RF signal;
   (g) means for quenching the optical RF signal inside the optical fiber RF delay loop; wherein the apparatus comprises further means for converting reproduced optical RF signals to spread spectrum RF signals.

18. The apparatus of claim 17 further comprising a processor; wherein the processor comprises a stable clock; wherein the processor comprises means of processing reproduced spread spectrum RF signals with a reference to the stable clock; wherein the apparatus further comprises means of measuring carrier phases of reproduced spread spectrum RF signals.

19. The apparatus of claim 18 wherein said processor further comprises means for transforming the carrier phases to a frequency difference between the frequency of the reproduced spread spectrum RF signals and the frequency reference of the stable clock.

20. The apparatus of claim 17 further comprising multiple optical fiber RF delay loops; wherein the optical fiber RF delay loops comprise means of removing time arrival differences of the spread spectrum RF signals from different paths.

* * * * *